United States Patent
Steffl et al.

(10) Patent No.: US 9,852,826 B2
(45) Date of Patent: Dec. 26, 2017

(54) CABLE WITH SEMICONDUCTIVE LAYER MADE OF POLYPROPYLENE COMPOSITION AND IMPROVED LONG TERM THERMAL STABILITY

(75) Inventors: Thomas Steffl, Stenungsund (SE); Christer Svanberg, Kallered (SE)

(73) Assignee: BOREALIS AG, Vienna (AT)

( * ) Notice: Subject to any disclaimer, the term of this patent is extended or adjusted under 35 U.S.C. 154(b) by 634 days.

(21) Appl. No.: 13/702,425

(22) PCT Filed: May 31, 2011

(86) PCT No.: PCT/EP2011/058937
§ 371 (c)(1),
(2), (4) Date: Feb. 18, 2013

(87) PCT Pub. No.: WO2011/154288
PCT Pub. Date: Dec. 15, 2011

(65) Prior Publication Data
US 2013/0133922 A1    May 30, 2013

(30) Foreign Application Priority Data

Jun. 10, 2010  (EP) .................................... 10165492

(51) Int. Cl.
| H01B 7/00 | (2006.01) |
|---|---|
| B05D 5/12 | (2006.01) |
| H01B 1/00 | (2006.01) |
| H01B 1/20 | (2006.01) |
| C08L 23/14 | (2006.01) |
| H01B 1/24 | (2006.01) |
| H01B 3/44 | (2006.01) |
| H01B 3/04 | (2006.01) |
| C08K 3/04 | (2006.01) |
| C08L 23/08 | (2006.01) |
| C08L 23/16 | (2006.01) |
| C08L 51/00 | (2006.01) |

(52) U.S. Cl.
CPC .............. *H01B 1/20* (2013.01); *C08L 23/14* (2013.01); *H01B 1/24* (2013.01); *H01B 3/04* (2013.01); *H01B 3/441* (2013.01); *C08K 3/04* (2013.01); *C08L 23/0815* (2013.01); *C08L 23/0869* (2013.01); *C08L 23/16* (2013.01); *C08L 51/00* (2013.01)

(58) Field of Classification Search
CPC .. C08L 2666/02; C08L 23/0815; C08L 23/16; C08K 3/04; H01B 1/20; H01B 1/24
USPC ....... 174/120 SC, 120 SR; 427/117; 252/500
See application file for complete search history.

(56) References Cited

U.S. PATENT DOCUMENTS

| 3,865,699 A * | 2/1975 | Luch ............................. 205/158 |
|---|---|---|
| 4,002,595 A * | 1/1977 | Adelman ....................... 524/492 |
| 4,038,042 A * | 7/1977 | Adelman ....................... 428/625 |
| 4,169,816 A * | 10/1979 | Tsien ............................. 252/511 |
| 4,278,510 A * | 7/1981 | Chien et al. .................. 205/158 |
| 5,539,075 A * | 7/1996 | Gustafsson et al. .......... 526/339 |
| 5,852,135 A * | 12/1998 | Kanai et al. .................. 525/398 |
| 2001/0030053 A1* | 10/2001 | Gadessaud et al. .... 174/102 SC |
| 2002/0022687 A1* | 2/2002 | Hikita et al. .................. 524/528 |
| 2006/0116279 A1* | 6/2006 | Kogoi et al. .................. 502/103 |
| 2006/0249705 A1* | 11/2006 | Wang et al. ........... 252/62.51 C |
| 2008/0124521 A1* | 5/2008 | Niino ............................ 428/138 |
| 2009/0045908 A1* | 2/2009 | Tanaka et al. .................. 338/25 |
| 2009/0280282 A1* | 11/2009 | Doty et al. ................. 428/36.91 |
| 2010/0022715 A1* | 1/2010 | Grein et al. .................. 525/221 |
| 2010/0025073 A1* | 2/2010 | Fagrell et al. .......... 174/120 SC |
| 2010/0163269 A1* | 7/2010 | Perego et al. ................ 174/107 |
| 2010/0181096 A1* | 7/2010 | Smedberg et al. ..... 174/120 SC |
| 2010/0222535 A1* | 9/2010 | Eaton ............................ 526/348 |

(Continued)

FOREIGN PATENT DOCUMENTS

| EP | 0129617 | 1/1985 |
|---|---|---|
| EP | 1008464 | 6/2000 |
| EP | 1630823 | 3/2006 |

(Continued)

OTHER PUBLICATIONS

International Search Report for PCT/EP2011/058937 dated Jul. 11, 2011.

(Continued)

*Primary Examiner* — William H Mayo, III
*Assistant Examiner* — Rhadames J Alonzo Miller
(74) *Attorney, Agent, or Firm* — Gardner Groff Greenwald & Villanueva, PC

(57) ABSTRACT

Described herein is a cable that includes a conductor surrounded by at least one semiconductive layer, wherein the layer comprises a polymer composition comprising a polypropylene homopolymer or a polypropylene copolymer with one or more comonomers, a polyolefin functionalized with an anhydride of a mono- or polycarboxylic acid, wherein said anhydride of a mono- or polycarboxylic acid can be linear or cyclic, wherein the functionalized polyolefin is different from the polypropylene homopolymer or polypropylene copolymer or the second polymer, and wherein the amount of the functionalized polyolefin is up to 10 wt % based on the total amount of the polymer composition, a solid conductive filler and a LDPE homopolymer or a LDPE copolymer of ethylene with one or more comonomers having a melting temperature (Tm) less than the Tm of the polypropylene homopolymer or polypropylene copolymer. Also described herein is a process for producing the polymer composition.

16 Claims, No Drawings

(56) References Cited

U.S. PATENT DOCUMENTS

2010/0319959 A1* 12/2010 Eaton et al. ............ 174/110 SR

FOREIGN PATENT DOCUMENTS

| EP | 1916673 |  | 4/2008 | |
|----|---------|---|--------|---|
| EP | 1916673 | A1 * | 4/2008 | .......... C08L 23/0892 |
| EP | 2128194 |  | 12/2009 | |
| EP | 2128194 | A1 * | 12/2009 | .......... C08L 23/0869 |
| JP | 2008195933 |  | 8/2008 | |
| WO | 2009053042 |  | 4/2009 | |
| WO | 2009056408 |  | 5/2009 | |
| WO | 2011154287 |  | 12/2011 | |

OTHER PUBLICATIONS

International Search Report for PCT/EP2011/058936 dated Jul. 4, 2011.

\* cited by examiner

CABLE WITH SEMICONDUCTIVE LAYER MADE OF POLYPROPYLENE COMPOSITION AND IMPROVED LONG TERM THERMAL STABILITY

IN THE CROSS-REFERENCE TO RELATED APPLICATIONS

This application is a U.S. national phase application under 35 USC 371 of international application number PCT/EP2011/058937, filed May 31, 2011, which claims priority to European Application No. 10165492.9, filed Jun. 10, 2010, which is hereby incorporated herein by reference in its entirety for all purposes.

FIELD OF INVENTION

The present invention relates to a composition for a semiconductive layer suitable for cables. Moreover, the present invention is related to a process for producing said composition for a semiconductive layer as well as to the use of said composition. Further, the invention is also related to an article, preferably a cable, comprising said composition.

BACKGROUND

JP2002338780 discloses a way to improve the dispersibility of a carbon black in a conductive elastomer composition which is prepared by adding the carbon black as a conductive filler to a styrene-ethylene-butylene-styrene block copolymer (SEBS). By adding a carbon black and a maleic-anhydride-modified styrene-ethylene-butylene-styrene block copolymer to an SEBS, the dispersibility of the carbon black in the SEBS is improved.

In US2002/0188078 is disclosed a cable wherein at least one coating layer consists of a recyclable material which is halogen-free and has superior mechanical, electrical, and flame-retardant properties. This material consists of a polymer mixture comprising: (a) a crystalline propylene homopolymer or copolymer; and (b) a copolymer of ethylene with at least one alpha-olefin having from 4 to 12 carbon atoms, and optionally with a diene; the said copolymer (b) being characterized by a density of between 0.90 and 0.86 g/cm$^3$ and by a Composition Distribution Index, defined as the weight percentage of copolymer molecules having an alpha-olefin content within 50% of the average total molar content of alpha-olefin, of greater than 45%. This material may also include a flame-retardant inorganic filler.

In EP1619217 is disclosed an insulation layer for cables comprising a heterophasic polymer composition having superior mechanical and electrical properties and being environmentally friendly. The heterophasic polymer composition comprises a polymer matrix and dispersed therein a propylene copolymer having a weight average particle size of less than 1 μm.

In U.S. Pat. No. 6,663,974 is disclosed that MAH-grafted polypropylene (MAH-g-PP) is used to improve the poor adhesion of polyolefins to metals.

In EP1956611 is disclosed a power and/or telecommunication cable (I) which comprises at least one layer of a material comprising hardened phenolic resin nodules that are dispersed throughout the material, obtained from a composition (II) containing a thermoplastic polymer matrix and a phenolic resin, where the phenolic resin is phenol formaldehyde novolac resin or phenol novolac cyanate ester resin.

In EP1786864 there is disclosed compositions and shaped articles comprising or produced from the compositions. The compositions can comprise (a) at least one polypropylene polymer and (b) at least one E/X/Y copolymer wherein E comprises ethylene; X is a monomer such as vinyl acetate and alkyl (meth)acrylic esters; and Y is one or more additional comonomers such as carbon monoxide; sulfur dioxide; acrylonitrile; maleic anhydride; maleic acid diesters; (meth)acrylic acid, maleic acid, maleic acid monoesters, itaconic acid, fumaric acid, fumaric acid monoester, and salts thereof; glycidyl acrylate, glycidyl methacrylate, and glycidyl vinyl ether in which, based on the E/X/Y copolymer, X is from 0 to 50 weight %, Y is from 0 to 35 weight % of said, X and Y cannot both be 0%, and E is the remainder.

None of the documents however addresses undesired increase in volume resistivity upon ageing at elevated temperatures of solid conductive filler (e.g. carbon black) filled composites.

OBJECT OF THE INVENTION

It is hence an object of the present invention to provide a composition for use in a semiconductive layer which can address the undesired increase in volume resistivity upon ageing at elevated temperatures. It has now surprisingly been found that the above object can be achieved with the polymer composition of the invention as described below.

DETAILED DESCRIPTION OF THE INVENTION

The present invention thus provides a cable, comprising a conductor surrounded by at least one layer, wherein the layer comprises, preferably consists of, the polymer composition which comprises
  a) a polyolefin,
  b) a polyolefin functionalised with a mono- or polycarboxylic acid compound or a derivative of a mono- or polycarboxylic acid compound, wherein the functionalised polyolefin (b) is different from the polyolefin (a) or the optional second polymer (d), in case any of these is a polar copolymer,
  c) a solid conductive filler and, optionally,
  d) a second polymer which has a melting temperature (Tm) of less than the Tm of the polyolefin (a).

Accordingly, the (a) polyolefin, the (b) polyolefin functionalised with a mono- or polycarboxylic acid compound or a derivative of a mono- or polycarboxylic acid compound and the optional (d) second polymer which has a melting temperature (Tm) of less than the Tm of the polyolefin (a) present in the polymer composition of the inventive cable are different polymers, i.e. they differ from each other.

"Functionalised" means herein a chemical modification, preferably grafting or copolymerising with a mono- or polycarboxylic compound or a derivative of a mono- or polycarboxylic compound to provide the desired functional groups.

Both grafting and copolymerisation techniques are well known in the polymer field.

The polyolefin functionalised with a mono- or polycarboxylic acid compound or a derivative of a mono- or polycarboxylic acid compound (b) is referred herein also shortly as "functionalised polyolefin (b)".

The optional second polymer which has a melting temperature (Tm) of less than the Tm of the polyolefin (a) (d) is referred herein also shortly as "optional second polymer (d)".

The preferred cable is selected from
a cable comprising a conductor surrounded by at least a semiconductive layer comprising, preferably consisting of, the polymer composition which comprises
(a) a polyolefin,
(b) a polyolefin functionalised with a mono- or polycarboxylic acid compound or a derivative of a mono- or polycarboxylic acid compound, wherein the functionalised polyolefin (b) is different from the polyolefin (a) or the optional second polymer (d), in case any of these is a polar copolymer,
(c) a solid conductive filler and, optionally,
(d) a second polymer which has a melting temperature (Tm) of less than the Tm of the polyolefin (a), or
a cable comprising a conductor surrounded by at least an inner semiconductive layer, an insulation layer and an outer semiconductive layer, in that order, wherein at least the inner semiconductive layer or the outer semiconductive layer, comprises, preferably consists of, the polymer composition which comprises
(a) a polyolefin,
(b) a polyolefin functionalised with a mono- or polycarboxylic acid compound or a derivative of a mono- or polycarboxylic acid compound, wherein the functionalised polyolefin (b) is different from the polyolefin (a) or the optional second polymer (d), in case any of these is a polar copolymer,
(c) a solid conductive filler and, optionally,
(d) a second polymer which has a melting temperature (Tm) of less than the Tm of the polyolefin (a).

Accordingly, a decrease in conductivity of compositions containing a conductive filler can be reduced or even avoided through the use of the present invention. Surprisingly, the functionalised polyolefin (b) reduces the undesired increase in volume resistivity (VR) upon storing, i.e. ageing, at elevated temperatures. Accordingly also the use of the functionalised polyolefin (b) for reducing the increase in volume resistivity of the polymer composition after exposure thereof to elevated temperatures is provided.

Polymer Composition of the Cable of the Invention

Preferably, the polymer composition of the cable of the invention (referred herein also shortly as polymer composition) can be crosslinked or not. The crosslinked polymer composition has a typical network, i.a. interpolymer crosslinks (bridges), as well known in the field. Preferably, the polymer composition is thermoplastic, i.e. "non-crosslinked". It is noted herein that, as well known, the functionalised polyolefin (b) may form crosslinks amongst the component(s) of the polymer composition. Accordingly, "Non-crosslinked" means herein that crosslinking may occur as a result of reactions between the components (a) to (c) and optional (d), but the polymer composition does not comprise any crosslinking agent added as a further component, or is not irradiated, for the purpose to crosslink the composition. Accordingly, the polymer composition present in the final article, e.g. present in a layer of a final cable, in the end use of the article, preferably the cable, is preferably not crosslinked by any crosslinking agent added as a further component(s), or crosslinked by irradiation step, and is thus called thermoplastic.

Unexpectedly, the VR of the polymer composition is less affected during the ageing at elevated temperatures compared to a same composition, but without the functionalised polyolefin (b). Preferably, the presence of the functionalised polyolefin (b) has an effect of minimising or even preventing the increase of the volume resistivity of the polymer composition during the storing (i.e. ageing) thereof or the operation of the cable at elevated temperatures, when measured with the determination method as described below under "Determination methods", compared to a same composition, but without the functionalised polyolefin (b). Also unexpectedly the functionalised polyolefin (b) has preferably insignificant effect, if effect at all, on the melt flow rate (at 230° C. and load 5.0 kg, $MFR_5$) of the polymer composition, compared to a same composition but without the functionalised polyolefin (b), while the presence of the functionalised polyolefin (b) prevents the above discussed VR increase of the polymer composition.

The polymer composition preferably comprises the polyolefin (a) in an amount of from 40 to 99.5 wt %, more preferably 50 to 90 wt %, even more preferably 60 to 80 wt %, based on the combined weight (100 wt %) of the polyolefin (a), the functionalised polyolefin (b) and the optional second polymer (d) present in the polymer composition.

The polymer composition preferably comprises the functionalised polyolefin (b) of from 0.1 to 5.0 wt %, more preferably 0.6 to 4.0 wt %, even more preferably 0.9 to 3.0 wt %, based on the combined weight (100 wt %) of the polyolefin (a), the functionalised polyolefin (b) and the optional second polymer (d) present in the polymer composition.

The polymer composition comprises the optional second polymer (d), if present, preferably in an amount of from 1.0 to 65 wt %, preferably from 5 to 55 wt %, more preferably from 10 to 50 wt %, more preferably from 15 to 45 wt %, more preferably from 20 to 45 wt %, more preferably from 25 to 40 wt %, more preferably from 25 to 35 wt %, based on the combined weight (100 wt %) of the polyolefin (a), the functionalised polyolefin (b) and the optional second polymer (d) present in the polymer composition.

The combined amount of the polyolefin (a), the functionalised polyolefin (b) and the optional second polymer (d) present in the polymer composition is preferably of at least 50 wt %, preferably from 60 to 80 wt %, more preferably of from 65 to 75 wt %, based on the total amount (100 wt %) of the polymer composition.

The polymer composition preferably comprises the polyolefin (a) of from 30 to 80 wt %, preferably of from 40 to 75 wt %, preferably of from 45 to 75 wt %, based on the total amount (100 wt %) of the polymer composition.

The polymer composition preferably comprises up to 10.0 wt %, preferably up to 5.0 wt %, preferably from 0.1 to 4.0 wt %, preferably of from 0.5 to 3.5 wt %, preferably of from 0.6 to 2.0 wt %, more preferably from 0.7 to 1.5 wt % of the functionalised polyolefin (b), based on the total amount (100 wt %) of the polymer composition.

If present, then the polymer composition preferably comprises from 0.5 to 50 wt %, preferably of from 10 to 40 wt %, preferably of from 15 to 35 wt %, more preferably of from 15 to 30 wt %, of the optional second polymer (d), based on the total amount (100 wt %) of the polymer composition.

The polymer composition preferably comprises the solid conductive filler (c) in an amount of up to 50 wt %, preferably from 5 to 45 wt %, more preferably of from 10 to 45 wt %, more preferably of from 25 to 35 wt %, based on the total amount (100 wt %) of the polymer composition. The amount of solid conductive filler (c) depends on the nature of the filler and the desired resistivity, as evident for a skilled person.

In the preferred embodiment of the invention the polymer composition comprises one or more the optional second polymer(s) (d), preferably one optional second polymer (d).

The optional second polymer with a low Tm improves the mechanical properties such as flexibility (expressed e.g. as Tensile strain at break (%) properties measured according to ISO 527-2. Moreover, the presence of the optional second polymer (d), in addition to high flexibility, provides preferably also high impact strength (expressed e.g as Charpy Notch Impact Strength (NIS) test not only at high temperatures but, surprisingly, also at low temperatures at −20° C., measured in accordance with ISO 179-1 eA:2000. The mechanical properties of the polymer composition are highly desired particularly when working at low temperatures where any cracking should be avoided when bending cables.

Preferably, the polymer composition has an MFR (230° C., 5.0 kg) from 0.01 to 30.0 g/10 min, preferably from 0.05 to 20.0 g/10 min, preferably from 0.1 to 10.0 g/10 min, more preferably from 1.0 to 8.0 g/10 min. The MFR is determined from a polymer composition which is cooled to and kept at 20-22° C. after the production thereof, preferably in the form of pellets.

Additionally, the polymer composition may comprise further components, such as additives and/or further polymer components, e.g. additives and/or further polymer components conventionally used in the desired end application.

As to further polymer components, preferably the polymer composition comprises no further polymer components in addition to the polyolefin (a), the functionalised polyolefin (b), and the optional second polymer (d), if present. Accordingly, the preferred polymer composition consists of the polyolefin (a), the functionalised polyolefin (b) and the optional second polymer (d), if present, as the only polymer components. However, it is to be understood herein that the polymer composition may comprise further component(s), such as additive(s), which may optionally be added in a mixture with a carrier polymer, e.g. in so called master batch. Also the solid conductive filler (c) can be added in form of a master batch. In such cases the carrier polymer is not calculated to the amount of the polymer components. The amount of additives and the carrier polymer of any master batch is calculated to the total amount (100% wt) of the polymer composition.

As additives, such as any of antioxidant(s), scorch retarder(s) (SR), stabiliser(s), processing aid(s), flame retardant additive(s), water tree retardant additive(s), acid or ion scavenger(s) and inorganic filler(s) as known in the polymer field.

As non-limiting examples of antioxidants e.g. sterically hindered or semi-hindered phenols, aromatic amines, aliphatic sterically hindered amines, organic phosphites or phosphonites, thio compounds, and mixtures thereof, can be mentioned. Specific examples are TMQ, i.e. 2,2,4-trimethyl-1,2-dihydroquinoline (CAS No. 26780-96-1) and Naugard 445™ i.e. 4,4'-bis(1,1'-dimethylbenzyl)diphenylamine (CAS No. 10081-67-1); preferably TMQ is used. The amount of an antioxidant is preferably from 0.005 to 2.5 wt % based on the total amount (100 wt %) of the polymer composition. The antioxidant(s) are preferably added in an amount of 0.005 to 2.0 wt %, more preferably 0.01 to 1.5 wt %, even more preferably 0.04 to 0.8 wt %, based on the total amount (100 wt %) of the polymer composition.

The following preferable embodiments, properties and subgroups of the polyolefin (a), the functionalised polyolefin (b), the solid conductive filler (c), the optional second polymer (d) suitable and the polymer composition for the cable of the invention are independently generalisable so that they can be used in any order or combination to further define the preferable embodiments of the cable of the invention produced using the polymer composition.

Where herein it is referred to a polymer or a polyolefin, then if is intended to mean both a homo- and copolymer of a polymer or of a polyolefin. E.g. ethylene polymer or polyethylene or, respectively, propylene polymer or polypropylene, means an ethylene homo- and copolymer or, respectively, propylene homo- and copolymer. The polyolefin copolymer may contain one or more comonomer(s). As well known "comonomer" refers to copolymerisable comonomer units.

Polyolefin (a)

The polyolefin (a) suitable for the polymer composition of the cable of the invention can be any commercially available polyolefin suitable for the present invention or can be prepared according to or analogously to known polymerization processes described in the chemical literature. The polyolefin (a) forms the base polymer of the polymer composition.

Preferably, the polyolefin (a) is a polyethylene or polypropylene.

The preferred polyolefin (a) is a polypropylene selected from a homopolymer of propylene or a copolymer of propylene with one or more comonomer(s), preferably with ethylene or higher alpha-olefins, or any mixtures thereof. The copolymer of propylene with one or more comonomer(s), preferably with one or more of ethylene or higher alpha-olefin comonomer(s), can be a random copolymer of propylene or a heterophasic copolymer of propylene, which have a well known meaning. The heterophasic copolymer of propylene suitable as the propylene polymer (a) can have a propylene homopolymer or a propylene random copolymer matrix component (1), wherein another propylene copolymer component (2) is dispersed. The propylene copolymer component (2) has typically a lower structural order (also known as block copolymer of propylene or a rubber part) than the matrix polymer.

In the random copolymer of propylene the comonomer(s) are distributed randomly to the backbone of the propylene polymer chain.

According to a preferred embodiment of the polyolefin (a), the propylene polymer is a heterophasic polymer composition comprising a propylene homopolymer matrix (1) or random copolymer matrix (1) and dispersed therein a propylene copolymer component (2) with one or more ethylene or higher alpha-olefin comonomer(s).

Accordingly, there are essentially two kinds of heterophasic propylene copolymers known in the art, namely heterophasic copolymers comprising a propylene random copolymer as matrix phase (RAHECO) or heterophasic copolymers having a propylene homopolymer as matrix phase (HECO). Again, also in case of heterophasic copolymers of propylene, a random copolymer matrix (1) is a copolymer where the comonomer part is randomly distributed in the polymer chains, i.e. consists of alternating sequences of two monomeric units of random length (including single molecules).

Preferably, the propylene copolymer (2) dispersed in the propylene homopolymer or copolymer matrix (1) of the heterophasic propylene copolymer as the propylene polymer (a) is substantially amorphous. The term "substantially amorphous" means herein that the propylene copolymer (2) is less crystalline than the homopolymer or copolymer matrix (1), prefereably that the propylene copolymer has a residual crystallinity below a level corresponding to a melting enthalpy of 10 J/g measured according to DSC-ISO 3146.

More preferably, the propylene copolymer (2) dispersed in the propylene homopolymer or copolymer matrix (1) of the heterophasic propylene copolymer as the polyolefin (a) has a weight average particle size of at least less than 1 μm; preferably of 0.9 μm or less, more preferably of 0.8 μm or less. This preferable weight average particle size of less than 1 μm allows a good particle distribution of the dispersed propylene copolymer component to the matrix component and contributes to the impact strength of the polymer composition. Moreover, a low weight average particle size decreases the risk of crazes being initiated by these particles while improving the possibility of said particles to stop already formed crazes or cracks. The weight average particle size distribution of said dispersed propylene copolymer in said polypropylene matrix can be determined by suitable microscopic methods. Examples for such methods are atomic force microscopy (AFM), scanning electron microscopy (SEM) and transmission electron microscopy (TEM). Etching and/or staining of the specimens is normally required to achieve the necessary resolution and clarity of images. Examples for the determination of the particle size distribution and the calculation of the weight average particle size there from can be found in the literature. A suitable method involving SEM on specimens stained with $RuO_4$ is described in Pölt et al. J. Appl. Polym. Sci. 78 (2000) 1152-61.

Preferably said polypropylene matrix (1) of the heterophasic polypropylene as the polyolefin (a) has a melting enthalpy of 25 to 70 J/g at a temperature range of 130° C. to 170° C. measured according to DSC-ISO 3146.

The preferred heterophasic polypropylene as the preferred polyolefin (a) is a random heterophasic propylene copolymer (RAHECO). It is preferred that the random propylene copolymer or the matrix of the random heterophasic polypropylene as defined above comprises at least one comonomer selected from the group consisting of ethylene and $C_4$-$C_8$ alpha-olefins. Preferred $C_4$-$C_8$ alpha-olefins are 1-butene, 1-pentene, 4-methyl-1-pentene, 1-hexene, 1-heptene or 1-octene, more preferred 1-butene. The most preferred random propylene copolymer consists of propylene and ethylene. Furthermore, the comonomer content of the polypropylene matrix preferably is 0.5 to 30 wt %, more preferably 1 to 20 wt % and most preferably 2 to 7 wt %.

Preferably the polypropylene polymer as the polyolefin (a) of the polymer composition has an MFR (230° C., 2.16 kg) from 0.05 to 20.0 g/10 min, preferably from 0.05 to 10.0 g/10 min, preferably from 0.1 to 10.0 g/10 min, depends on the desired end application. In some applications MFR (230° C., 2.16 kg) of even from 0.2 to 2.0 g/10 min is desired.

The polypropylene as the preferred polyolefin (a) has a melting temperature, Tm, of at least 100° C., preferably from 110 to 180° C., preferably from 120 to 170° C., more preferably from 130 to 160° C., more preferably from 135 to 150° C. The preferred polymer composition comprising polypropylene as the polyolefin (a) with high Tm has an advantage of having desirable impact strength and flexibility properties both at low and high temperatures and, additionally, an advantage of withstanding higher operating temperatures e.g. up to 90, when using a base polymer with high Tm.

Examples of suitable polypropylenes are described in e.g. WO03/0026522.

Functionalised Polyolefin (b)

As to the polyolefin functionalised with a mono- or polycarboxylic acid compound or a derivative of a mono- or polycarboxylic acid compound (b) suitable for the polymer composition of the cable of the invention.

"Functionalised with a mono- or polycarboxylic acid compound or a derivative of a mono- or polycarboxylic acid compound" or shortly "functionalised" means herein generally that the polymer is functionalised with carbonyl containing groups originating from said mono- or polycarboxylic acid group or a derivative thereof. The carbonyl containing compound used for the functionalisation is typically unsaturated. Such compound contains preferably at least one ethylenic unsaturation and at least one carbonyl group. Such carbonyl containing groups can be incorporated to a polymer by grafting a compound bearing said carbonyl containing group(s) or by copolymerising a monomer with a comonomer(s) bearing such carbonyl containing group(s).

Herein, the functionalised carbonyl containing compound of functionalised polyolefin (b) is understood not to mean any polar comonomer(s), e.g. an acrylate, a methacrylate or an acetate comonomer, optionally present in the polyolefin (a) or in the optional second polymer (d). Accordingly, the functionalised polyolefin (b) is different from the polyolefin (a) or the optional second polymer (d), in case any of these is a polar copolymer.

Moreover, the functionalised carbonyl containing compound of functionalised polyolefin (b) is understood herein not to mean a polar comonomer(s), e.g. an acrylate, a methacrylate or an acetate comonomer, which may additionally be present in the polyolefin polymer which is to be further functionalised with said carbonyl containing compound to form said functionalised polyolefin (b), as will be discussed later below.

The functionalised polyolefins (b) suitable for the present invention are well known and are commercially available or can be produced according to the known processes described in the chemical literature.

Preferable polycarboxylic acid compounds for functionalisation are unsaturated dicarboxylic acids or derivatives thereof. More preferable carbonyl containing compounds for the functionalisation are derivatives of unsaturated mono- or polycarboxylic acid compounds, more preferably derivatives of unsaturated dicarboxylic acids. Preferred carbonyl containing compounds for functionalisation are anhydrides of a mono- or polycarboxylic acid, which are also referred as "acid anhydrides" or "anhydrides". The acid anhydrides can be linear or cyclic.

Preferably the functionalised polyolefin (b) is an acid anhydride functionalised polyolefin, more preferably a maleic anhydride (MAH) functionalised polyolefin (b). Preferably, the functionalised polyolefin (b) is obtainable by grafting maleic anhydride to a polyolefin (also referred herein shortly as MAH grafted polyolefin or MAH-g-polyolefin).

Preferred polyolefin for functionalised polyolefin (b) is a functionalised polypropylene or polyethylene. Both polyolefin types are well known in the field.

In case the functionalised polyolefin (b) is a functionalised polyethylene, then it is preferably selected from a polyethylene produced in a low pressure process using a coordination catalyst or a polyethylene produced in a high pressure (HP) polymerisation process and which bears said carbonyl containing groups. Both meanings are well known in the field.

The MFR (190° C., 2.16 kg) of the functionalised polyethylene is preferably of above 0.05 g/10 min, preferably from 0.1 to 200 g/20 min, preferably from 0.80 to 100 g/10 min, more preferably from 1.0 to 50.0 g/10 min.

In case the functionalised polyolefin (b) is a functionalised polyethylene produced in a low pressure process using a coordination catalyst, then it is preferably selected from copolymers of ethylene with one or more comonomer(s), preferably alpha-olefin(s). Such polyethylene copolymers have preferably a density of from 850 to 950 kg/m$^3$, preferably from 900 to 945 kg/m$^3$, preferably from 910 to 940 kg/m$^3$. Such functionalised polyethylene copolymer is preferably a functionalised linear low density polyethylene copolymers (LLDPE) which preferably has a density from 915 to 930 kg/m$^3$. Preferable LLDPE as functionalised polyolefin (b) is MAH functionalised LLDPE, preferably MAH-g-LLDPE.

In case the functionalised polyolefin (b) is a functionalised polyethylene produced in a HP process, then the polyethylene is preferably produced by radical polymerisation in a HP process in the presence of an initiator(s). The HP reactor can be e.g. a well known tubular or autoclave reactor or a mixture thereof, preferably a tubular reactor. The high pressure (HP) polymerisation and the adjustment of process conditions for further tailoring the other properties of the polyolefin depending on the desired end application are well known and described in the literature, and can readily be used by a skilled person. Suitable polymerisation temperatures range up to 400° C., preferably from 80 to 350° C. and pressure from 70 MPa, preferably 100 to 400 MPa, more preferably from 100 to 350 MPa. Pressure can be measured at least after compression stage and/or after the tubular reactor. Temperature can be measured at several points during all steps.

Such functionalised polyethylene produced in a HP process is preferably a low density polyethylene (LDPE) which is functionalized and preferably has a density of from 900 to 950 kg/m$^3$, preferably from 910 to 940 kg/m$^3$, preferably from 915 to 930 kg/m$^3$. More preferably, the functionalised LDPE polymer is selected from a LDPE homopolymer or a LDPE copolymer of ethylene with one or more comonomers (referred herein also as functionalised polar LDPE copolymer), which bears said carbonyl containing groups. Suitable comonomers for functionalised LDPE copolymer are selected from olefins, preferably alpha-olefins, or polar comonomers, or any mixtures thereof. As said above such polar comonomers may additionally be present and are differentiated from the carbonyl containing compounds used for the functionalisation. Functionalised LDPE copolymer of ethylene with polar comonomer may optionally comprise other comonomer(s), such as alpha-olefin(s). Polar comonomer is preferably selected from a comonomer containing hydroxyl group(s), alkoxy group(s), carbonyl group(s), carboxyl group(s), ether group(s) or ester group(s), or a mixture thereof, more preferably from a comonomer(s) containing carboxyl and/or ester group(s), still more preferably, the polar comonomer(s) is selected from the group of acrylate(s), methacrylate(s) acrylic acids, methacrylic acids or acetate(s), or any mixtures thereof. The polar comonomer(s) for the functionalised polar LDPE copolymer is more preferably selected from the group of alkyl acrylates, alkyl methacrylates, acrylic acids, methacrylic acids or vinyl acetate, or a mixture thereof. It is further preferred that the comonomers are selected from $C_1$- to $C_6$-alkyl acrylates, $C_1$- to $C_6$-alkyl methacrylates, acrylic acids, methacrylic acids and vinyl acetate, more preferred from $C_1$- to $C_6$-alkyl acrylate such as methyl, ethyl, propyl or butyl acrylate, or vinyl acetate, or any mixture thereof. The amount of the polar comonomer in the functionalised LDPE copolymer is preferably from 5 to 50 wt % based on the total amount of the composition, more preferred up to 30 wt %, most preferred up to 25 wt %. Functionalised LDPE homopolymer or LDPE copolymer is preferably selected from a MAH functionalised LDPE homopolymer, a MAH functionalised LDPE copolymer which is preferably selected from a MAH functionalised ethylene methyl acrylate (EMA), a MAH functionalised ethylene ethyl acrylate (EEA), a MAH functionalised ethylene butyl acrylate (EBA) or MAH functionalised ethyl vinyl acrylate (EVA), more preferably from MAH-g-LDPE homopolymer or MAH-g-LDPE copolymer, more preferably from MAH-g-EMA, MAH-g-EEA, MAH-g-EBA or MAH-g-EVA.

In case the functionalised polyolefin (b) is a functionalised polypropylene, then it is preferably selected from homopolymers of propylene, random copolymers of propylene or a heterophasic copolymer of propylene, which have the same meaning and properties as given above under the general description for polyolefin (a) and which bear said carbonyl containing groups. The size of a dispersed copolymer (2) in heterophasic copolymer of propylene suitable for the polyolefin of the functionalised polyolefin (b) is not limited. Preferred polypropylene is homopolymer or a random copolymer of propylene.

According to a preferred embodiment of the polymer composition, the maleic anhydride functionalised, preferably grafted, polyolefin is maleic anhydride functionalised, preferably grafted, polypropylene (MAH-g-PP) or maleic anhydride functionalised, preferably grafted, polyethylene (MAH-g-PE).

Preferred polyolefin for the functionalised polyolefin (b) is a functionalised polypropylene as defined above. Such polypropylene (PP) for the functionalised polyolefin (b) is preferably a maleic anhydride functionalised PP, more preferably MAH-g-PP.

Preferably the content of said functionalised polyolefin (b), preferably the MAH functionalised PP, more preferably MAH-g-PP, is up to 10 wt %, preferably up to 5.0 wt %, preferably from 0.1 to 4.0 wt %, preferably from 0.5 to 3.5 wt %, preferably from 0.6 to 2.0 wt %, more preferably from 0.7 to 1.5 wt %, based on the total amount (100 wt %) of the polymer composition.

Further preferably the functionalised polyolefin (b), more preferably the MAH functionalised PP, more preferably MAH-g-PP, has an $MFR_2$ (230° C., 2.16 kg) of from 0.5 to 500 g/10 min, preferably from 1.0 to 500 g/10 min.

Solid Conductive Filler (c)

The solid conductive filler (c) suitable for the polymer composition of the cable of the invention is not limited and can be selected depending on the end application of said polyolefin composition. The solid conductive filler (c) is preferably any carbon black which is electrically conductive. Preferably the carbon black has one or more of the following properties: i) a primary particle size of at least 5 nm which is defined as the number average particle diameter according to ASTM D3849-95a procedure D, ii) iodine number of at least 30 mg/g according to ASTM D1510, and/or iii) DBP (dibutyl phthalate) absorption number of from 80 to 300 cm$^3$/100 g, preferably less than 180 cm$^3$/100 g, when measured according to ASTM D 2414-06a.

Non-limiting examples of carbon blacks as said conductive filler (c) of the invention are e.g. carbon black grades described with ASTM Nxxx codes, e.g. N110 type, Ensaco black, supplied e.g. by Timcal, acetylene black, furnace black and Ketjen black.

Non-limiting examples of carbon blacks include furnace carbon blacks and acetylene blacks. Such carbon blacks are commercially available.

For the most preferred carbon black as the solid conductive filler (c), preferably the particle size is about 29 nm or less, preferably from 15 to 25 nm, the specific surface (BET)

is from 100 150 m²/g, preferably about 134 m²/g, and the Iodine number is from 140 to 180 g/kg, preferably about 160 g/kg.

According to a preferred embodiment of the polymer composition, the solid conductive filler (c) is present in an amount of from 10 to 45 wt %.

Optional Second Polyolefin (d)

The polymer composition suitable for the cable of the invention may optionally, and preferably, comprise a second polymer which has a melting temperature (Tm) of less than the Tm of the polyolefin (a). The polyolefin (a) and the optional second polyolefin (d) are different polymers. The optional second polymer (d) effects as a softener, which meaning is well known in the field. Suitable polymer as the optional second polyolefin (d) of the polymer composition is preferably selected from polyethylene or polypropylene. Such polyethylene or polypropylene can be any as defined above for polyolefin (a) provided that the melt temperature Tm of the polyethylene or polypropylene is lower than the Tm of polyolefin (a). Preferably the Tm of the optional second polymer (d) is at least 10° C., preferably at least 15° C., preferably at least 25° C., lower than the Tm of polyolefin (a). Preferably the Tm of the optional second polymer (d) is less than 100° C.

In case the optional second polyolefin (d) is a polypropylene, then it can be selected from a homopolymer or copolymer of propylene, wherein the copolymer of propylene is selected from a random copolymer or a heterophasic copolymer of propylene as defined above under polyolefin (a).

In case the optional second polyolefin (d) is a polyethylene, then it is preferably selected from a polyethylene produced in a low pressure process using a coordination catalyst or a polyethylene produced in a high pressure (HP) polymerisation process, as defined above under functionalised polyolefin (b).

More preferably, the optional second polyolefin (d) is a polyethylene produced in a HP process, preferably a low density polyethylene (LDPE) which is selected from a LDPE homopolymer or a LDPE copolymer of ethylene with one or more comonomers as defined above under functionalised polyolefin (b).

Preferred optional second polyolefin (d) is a LDPE copolymer of ethylene with one or more polar comonomer(s) and optionally with other comonomer(s) as defined above under functionalised polyolefin (b). The most preferred optional second polyolefin (d) is a LDPE copolymer of ethylene with at least a polar comonomer which is selected from ethylene methyl acrylate (EMA), ethylene ethyl acrylate (EEA), ethylene butyl acrylate (EBA) or ethyl vinyl acrylate (EVA), as defined above under functionalised polyolefin (b). EBA is the most preferred LDPE copolymer of ethylene as the optional second polyolefin (d). Further unexpectedly the addition of the polar LDPE copolymer as the optional second polyolefin (d) to a polymer composition comprising polyolefin (a), a fuctionalised polyolefin (b) and a solid conductive filler (c) results in a polymer composition which has highly advantageous impact strength at high temperatures and, surprisingly, also at low temperatures expressed as Charpy Notch Impact Strength at 23° C. and at −20° C. and measured in accordance with ISO 179-1eA:2000. Moreover, such polymer composition has, in addition to excellent impact strength, also high flexibility, even at low temperatures. Accordingly, the polymer composition of the invention has very desirable combination balance between impact strength and flexibility properties also at low temperatures.

Most preferably the polymer composition comprises the second polyolefin (d).

Preparation of the Polymer Composition for the Cable of the Invention

The invention polymer composition of the cable of the invention is preferably produced by a process for the manufacturing of a composition, which process comprises a step of mixing together,
- a) a polyolefin,
- b) a polyolefin functionalised with a mono- or polycarboxylic acid compound or a derivative of a mono- or polycarboxylic acid compound, wherein the functionalised polyolefin (b) is different from the polyolefin (a) or the optional second polymer (d), in case any of these is a polar copolymer,
- c) a solid conductive filler and, optionally,
- d) a second polymer which has a melting temperature (Tm) of less than the Tm of the polyolefin (a), preferably wherein the process comprises a further step of pelletising the obtained polymer composition.

In the mixing step of the process for the manufacturing of the polymer composition of the invention a polyolefin (a), a functionalised polyolefin (b), a solid conductive filler (c) and, optionally, an optional second polymer (d) are preferably mixed in a mixer or an extruder.

For mixing a conventional compounding or blending apparatus, e.g. a continuous single or twin screw mixer (extruder) such as Farell™, Werner and Pfleiderer and Buss (preferred), an internal batch mixer, such as Brabender™ and a Banbury™ mixer, a 2-roll rubber mill, a Buss-co-kneader or a twin screw extruder may be used. The mixing is preferably carried out before the polymer composition is provided to the article producer for producing the article. Preferably the polymer composition is mixed in an extruder and pelletised in a known manner to pellets. Pellets can be of any shape or size. The pre-made pellets of the polymer composition are preferably used by the end producer for producing an article.

The Cable

The cable comprises a conductor surrounded by at least one layer, wherein the layer comprises, preferably consists of, the polymer composition comprising
- a) a polyolefin,
- b) a polyolefin functionalised with a mono- or polycarboxylic acid compound or a derivative of a mono- or polycarboxylic acid compound, wherein the functionalised polyolefin (b) is different from the polyolefin (a) or the optional second polymer (d), in case any of these is a polar copolymer,
- c) a solid conductive filler and, optionally, a second polymer which has a melting temperature (Tm) of less than the Tm of the polyolefin (a).

The term "conductor" means herein above and below that the conductor comprises one or more wires. The wire can be for any use and be e.g. optical, telecommunication or electrical wire. Moreover, the cable may comprise one or more such conductors. Preferably the conductor is an electrical conductor and comprises one or more metal wires.

The cable is preferably a power cable. A power cable is defined to be a cable transferring energy operating at any voltage, typically operating at voltages higher than 1 kV. The voltage applied to the power cable can be alternating (AC), direct (DC), or transient (impulse). The polymer composition of the invention is very suitable for power cables, especially for power cables operating at voltages 6 kV to 36 kV (medium voltage (MV) cables) and at voltages higher than 36 kV, known as high voltage (HV) cables and extra high voltage (EHV) cables, which EHV cables operate, as well known, at very high voltages. The terms have well known meanings and indicate the operating level of such cables.

More preferably, the cable is selected from
a cable of a first embodiment comprising a conductor surrounded by at least a semiconductive layer comprising, preferably consisting of, the polymer composition which comprises
(a) a polyolefin,
(b) a polyolefin functionalised with a mono- or polycarboxylic acid compound or a derivative of a mono- or polycarboxylic acid compound, wherein the functionalised polyolefin (b) is different from the polyolefin (a) or the optional second polymer (d), in case any of these is a polar copolymer,
(c) a solid conductive filler and, optionally,
(d) a second polymer which has a melting temperature (Tm) of less than the Tm of the polyolefin (a), as defined above or in claims, or
a cable of a second embodiment comprising a conductor surrounded by at least an inner semiconductive layer, an insulation layer and an outer semiconductive layer, in that order, wherein at least the inner semiconductive layer or the outer semiconductive layer, comprises, preferably consists of, the polymer composition which comprises
(a) a polyolefin,
(b) a polyolefin functionalised with a mono- or polycarboxylic acid compound or a derivative of a mono- or polycarboxylic acid compound, wherein the functionalised polyolefin (b) is different from the polyolefin (a) or the optional second polymer (d), in case any of these is a polar copolymer,
(c) a solid conductive filler and, optionally,
(d) a second polymer which has a melting temperature (Tm) of less than the Tm of the polyolefin (a), as defined above or in claims.

The first embodiment and the second embodiment are equally preferred. In case of the second embodiment preferably at least the inner semiconductive layer, more preferably both the inner and outer semiconductive layer comprises the polymer composition of the invention.

The cable of the invention is preferably for LV, MV or HV power cable applications. Preferable cable is a MV or HV power cable, more preferably a MV power cable. Moreover the outer semiconductive layer can be strippable (peelable) or bonded (not peeled off), preferably bonded, which terms have a well known meaning.

As well known the cable can optionally comprise further layers, e.g. layers surrounding the insulation layer or, if present, the outer semiconductive layers, such as screen(s), a jacketing layer(s), other protective layer(s) or any combinations thereof.

The preparation process of the cable of the invention, is also provided, wherein a cable is produced by
(a) providing and mixing, preferably meltmixing in an extruder, the polymer composition of the invention as defined above or in claims,
(b) applying a meltmix of the polymer composition obtained from step (a), preferably by (co)extrusion, on a conductor to form at least one layer, preferably a semiconductive layer (the first embodiment of the cable).

The preparation process of the invention for producing the power cable of the second embodiment comprising a conductor surrounded by an inner semiconductive layer, an insulation layer, and an outer semiconductive layer, in that order, wherein the process comprises the steps of
(a)
providing and mixing, preferably meltmixing in an extruder, a first semiconductive composition comprising a polymer, a conductive filler and optionally further component(s) for the inner semiconductive layer,
providing and mixing, preferably meltmixing in an extruder, a polymer composition for the insulation layer,
providing and mixing, preferably meltmixing in an extruder, a second semiconductive composition which is preferably and comprises a polymer, a conductive filler and optionally further component(s) for the outer semiconductive layer,
(b)
applying on a conductor, preferably by coextrusion,
a meltmix of the first semiconductive composition obtained from step (a) to form the inner semiconductive layer,
a meltmix of polymer composition obtained from step (a) to form the insulation layer, and
a meltmix of the second semiconductive composition obtained from step (a) to form the outer semiconductive layer,
wherein at least one of the first semiconductive composition or the second semiconductive composition, preferably both the first semiconductive composition and the second semiconductive composition, comprises the polymer composition of the invention as defined above or in claims.

Melt mixing means mixing above the melting temperature of at least the major polymer component(s) of the obtained mixture and is typically carried out in a temperature of at least 15° C. above the melting or softening point of polymer component(s).

The term "(co)extrusion" means herein that in case of two or more layers, said layers can be extruded in separate steps, or at least two or all of said layers can be coextruded in a same extrusion step, as well known in the art. The term "(co)extrusion" means herein also that all or part of the layer(s) are formed simultaneously using one or more extrusion heads. For instance triple extrusion can be used for forming three cable layers.

Preferable the polymer composition is provided to the (melt)mixing step (a) in form of pre-made pellets as described above.

In a preferred embodiment the polymer composition of the invention is not crosslinked, i.e. is thermoplastic in the final article. Also preferably, the final article, preferably cable, more preferably the power cable, as defined above or in claims, is not crosslinked. In this preferred embodiment the article, preferably the cable, more preferably the power cable, as defined above is non-crosslinked when used in the end application thereof.

It is preferred that one of the layers of the power cable is thermoplastic, i.e. non-crosslinked, more preferably that all of the layers are thermoplastic.

Determination Methods

Wt % Means Weight by %.

Comonomer Contents a) Comonomer Content in Copolymer of Polypropylene:

Quantitative Fourier transform infrared (FTIR) spectroscopy was used to quantify the amount of comonomer.

Calibration was achieved by correlation to comonomer contents determined by quantitative nuclear magnetic resonance (NMR) spectroscopy.

The calibration procedure based on results obtained from quantitative $^{13}$C-NMR spectroscopy was undertaken in the conventional manner well documented in the literature.

The amount of comonomer (N) was determined as weight percent (wt %) via:

$$N=k1(A/R)+k2$$

wherein A is the maximum absorbance defined of the comonomer band, R the maximum absorbance defined as peak height of the reference peak and with k1 and k2 the linear constants obtained by calibration. The band used for ethylene content quantification is selected depending if the ethylene content is random (730 cm$^{-1}$) or block-like (as in heterophasic PP copolymer) (720 cm$^{-1}$). The absorbance at 4324 cm$^{-1}$ was used as a reference band.

b) Quantification of Alpha-Olefin Content in Linear Low Density Polyethylenes and Low Density Polyethylenes by NMR Spectroscopy:

The comonomer content was determined by quantitative 13 C nuclear magnetic resonance (NMR) spectroscopy after basic assignment (J. Randall JMS—Rev. Macromol. Chem. Phys., C29(2&3), 201-317 (1989). Experimental parameters were adjusted to ensure measurement of quantitative spectra for this specific task.

Specifically solution-state NMR spectroscopy was employed using a Bruker AvancelII 400 spectrometer. Homogeneous samples were prepared by dissolving approximately 0.200 g of polymer in 2.5 ml of deuterated-tetrachloroethene in 10 mm sample tubes utilising a heat block and rotating tube oven at 140 C. Proton decoupled 13 C single pulse NMR spectra with NOE (powergated) were recorded using the following acquisition parameters: a flip-angle of 90 degrees, 4 dummy scans, 4096 transients an acquisition time of 1.6 s, a spectral width of 20 kHz, a temperature of 125 C, a bilevel WALTZ proton decoupling scheme and a relaxation delay of 3.0 s. The resulting FID was processed using the following processing parameters: zero-filling to 32 k data points and apodisation using a gaussian window function; automatic zeroth and first order phase correction and automatic baseline correction using a fifth order polynomial restricted to the region of interest.

Quantities were calculated using simple corrected ratios of the signal integrals of representative sites based upon methods well known in the art.

c) Comonomer Content of Polar Comonomers in Linear Low Density Polyethylene (1) Polymers Containing >6 wt. % Polar Comonomer Units Comonomer content (wt %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene ethyl acrylate, ethylene butyl acrylate and ethylene methyl acrylate. Film samples of the polymers were prepared for the FTIR measurement: 0.5-0.7 mm thickness was used for ethylene butyl acrylate and ethylene ethyl acrylate and 0.10 mm film thickness for ethylene methyl acrylate in amount of >6 wt %. Films were pressed using a Specac film press at 150° C., approximately at 5 tons, 1-2 minutes, and then cooled with cold water in a not controlled manner. The accurate thickness of the obtained film samples was measured.

After the analysis with FTIR, base lines in absorbance mode were drawn for the peaks to be analysed. The absorbance peak for the comonomer was normalised with the absorbance peak of polyethylene (e.g. the peak height for butyl acrylate or ethyl acrylate at 3450 cm$^{-1}$ was divided with the peak height of polyethylene at 2020 cm$^{-1}$). The NMR spectroscopy calibration procedure was undertaken in the conventional manner which is well documented in the literature, explained below.

For the determination of the content of methyl acrylate a 0.10 mm thick film sample was prepared. After the analysis the maximum absorbance for the peak for the methylacrylate at 3455 cm$^{-1}$ was subtracted with the absorbance value for the base line at 2475 cm$^{-1}$ ($A_{methylacrylate}-A_{2475}$). Then the maximum absorbance peak for the polyethylene peak at 2660 cm$^{-1}$ was subtracted with the absorbance value for the base line at 2475 cm$^{-1}$ ($A_{2660}-A_{2475}$). The ratio between ($A_{methylacrylate}-A_{2475}$) and ($A_{2660}-A_{2475}$) was then calculated in the conventional manner which is well documented in the literature.

The weight-% can be converted to mol-% by calculation. It is well documented in the literature.

Quantification of Copolymer Content in Polymers by NMR Spectroscopy

The comonomer content was determined by quantitative nuclear magnetic resonance (NMR) spectroscopy after basic assignment (e.g. "NMR Spectra of Polymers and Polymer Additives", A. J. Brandolini and D. D. Hills, 2000, Marcel Dekker, Inc. New York).

Experimental parameters were adjusted to ensure measurement of quantitative spectra for this specific task (e.g. "200 and More NMR Experiments: A Practical Course", S. Berger and S. Braun, 2004, Wiley-VCH, Weinheim). Quantities were calculated using simple corrected ratios of the signal integrals of representative sites in a manner known in the art.

(2) Polymers Containing 6 wt. % or Less Polar Comonomer Units

Comonomer content (wt. %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene butyl acrylate and ethylene methyl acrylate. For the FT-IR measurement a film samples of 0.05 to 0.12 mm thickness were prepared as described above under method 1). The accurate thickness of the obtained film samples was measured.

After the analysis with FT-IR base lines in absorbance mode were drawn for the peaks to be analysed. The maximum absorbance for the peak for the comonomer (e.g. for methylacrylate at 1164 cm$^{-1}$ and butylacrylate at 1165 cm$^{-1}$) was subtracted with the absorbance value for the base line at 1850 cm$^{-1}$ ($A_{polar\ comonomer}-A_{1850}$). Then the maximum absorbance peak for polyethylene peak at 2660 cm$^{-1}$ was subtracted with the absorbance value for the base line at 1850 cm$^{-1}$ ($A_{2660}-A_{1850}$). The ratio between ($A_{comonomer}-A_{1850}$) and ($A_{2660}-A_{1850}$) was then calculated. The NMR spectroscopy calibration procedure was undertaken in the conventional manner which is well documented in the literature, as described above under method 1).

The weight-% can be converted to mol-% by calculation. It is well documented in the literature.

Below is exemplified how polar comonomer content obtained from the above method (1) or (2), depending on the amount thereof, can be converted to micromol or mmol per g polar comonomer as used in the definitions in the text and claims:

The millimoles (mmol) and the micro mole calculations have been done as described below.

For example, if 1 g of the poly(ethylene-co-butylacrylate) polymer, which contains 20 wt % butylacrylate, then this material contains $0.20/M_{butylacrylate}$ (128 g/mol)=$1.56 \times 10^{-3}$ mol. (=1563 micromoles).

The content of polar comonomer units in the polar copolymer $C_{polar\ comonomer}$ is expressed in mmol/g (copolymer). For example, a polar poly(ethylene-co-butylacrylate) polymer which contains 20 wt. % butyl acrylate comonomer units has a $C_{polar\ comonomer}$ of 1.56 mmol/g.

The used molecular weights are: $M_{butylacrylate}$=128 g/mole, $M_{ethylacrylate}$=100 g/mole, $M_{methylacrylate}$=86 g/mole).

Density:

Low density polyethylene (LDPE): The density was measured according to ISO 1183-2. The sample preparation was executed according to ISO 1872-2 Table 3Q (compression moulding).

Low process polyethylene: Density of the polymer was measured according to ISO 1183/1872-2B.

The Melt Flow Rate (MFR):

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylene and at 230° C. for polypropylene. MFR may be determined at different loadings such as 2.16 kg ($MFR_2$) or 21.6 kg ($MFR_{21}$).

In this application the MFR was measured according to ISO 1133 measured at 230° for PP components and 190° for PE, EBA and EMA components. The MFR of the polymer composition was measured according to ISO 1133 measured at 230° with 5.0 kg load ($MFR_5$ at 230°).

The Volume Resistivity (VR):

was measured on strings extruded during the MFR tests using the following procedure: The strings had a diameter D between 1 and 10 mm, preferably around 3 mm, and a length L of 10 to 1000 mm, preferably around 100 mm. The diameter was measured using callipers and the length with a ruler, both recorded in centimeters. The resistance R was measured in ohms using an ohm-meter. The area A was calculated as A=pi*(D/2)^2. The volume resistivity VR was calculated as VR=R*A/L.

Melting Temperature Tm, Crystallization Temperature Tc, Melting Enthalpy Hm, Crystallization Enthalpy Hc, Crystallinity Xc of Polypropylene:

ISO 11357-3:1999, The melting temperature Tm, crystallisation temperature Tc and degree of crystallinity of propylene polymer (a) are measured for with a Mettler TA820 differential scanning calorimetry device (DSC) on 3±0.5 mg samples. Crystallisation and melting temperatures are obtained during 10° C./min cooling and heating scans between 30° C. and 225° C. Melting and crystallisation temperatures were taken as the peaks of the endotherms and exotherms. It is measured on cut specimens of 0.5 mg. The values for melting point Tm and melting enthalpy Hm are determined in the second heat (PP method −30° C.).

The Measurement of the Melting Temperature $T_m$ of the Polyolefin (a) and Optional Second Polymer (d) Other than Polypropylene:

carried out by Differential Scanning calorimetry (DSC) according to ISO 11357-6 using a heating and cooling rate of 10° C./min.

$T_m$ was measured with Mettler TA821 using a 5±1 mg sample in a nitrogen atmosphere. First the sample was melted (30° C. to 180° C. with a heating rate of 10° C./min) and then it was held at 180° C. for 5 min. After that the sample was cooled down to −30° C. with a cooling rate of 10° C./min followed by a second melting (−30° C. to 180° C. at a heating rate of 10° C./min). The data reported and used in Tables 1 to 3 were all taken from the second melting. For the determination of $T_m$ a base line was drawn from 0° C. to the point in the DSC curve where the melting is completed. $T_m$ is defined as the temperature where the heat flow to the sample is at its maximum, e.g. where the distance from the measured DSC curve and the base line is at its maximum.

Experimental Part

The following components were used in the inventive and reference examples of the polymer composition of the invention given below:

Polyolefin (a):

Commercially available Borsoft™ SA233CF available from Borealis Polyolefine GmbH (Austria) which is a random-heterophasic polypropylene copolymer comprising a polypropylene-co-ethylene-random copolymer as matrix phase and an ethylene propylene-rubber as dispersed phase, which had an $MFR_2$ (230° C., 2.16 kg) of 0.8 g/10 min and melt temperature Tm of 138-142° C. (DSC according to IS03146).

Functionalised Polyolefin (b):

Commercially available Exxelor™ PO1020 which is a maleic anhydride (MAH) functionalized (grafted) polypropylene available from Exxon Mobil (USA) having a density 0.9 g/cm3, an MFR2 (230° C./2.16 kg) of 430 g/10 min and a MAH content of 1.0 mol %.

Optional Second Polymer (d):

A conventional copolymer of ethylene with butyl acrylate polymer produced in a tubular reactor of a high pressure polymerisation process, MFR (190° C., 2.16 kg) of 7 g/10 min. Butyl Acrylate (BA) content of 17 wt % and melt temperature Tm=96° C.

Solid Conductive Filler (c):

Carbon black—commercially available Elftex™ 254, from Cabot (in the form of dry pelletized carbon blacks) with the following properties:

| | |
|---|---|
| Iodine number | <160 mg/g |
| Particle size | <25 nm |
| Ash content | <0.1% |
| Toluene extract | <0.03% |

Antioxidant (TMQ):

Commercially available Vulcanox™ HS/LG, available from Lanxess (supplier).

Compounding (Mixing) of the Polymer Compositions of the Examples:

The reference example with no functionalised polyolefin (b) and the inventive example with 1.0 wt % of Functionalised polyolefin (b) were mixed by compounding (see the amounts of the used components in Table 1) on a Buss MDK 46 kneader (supplier Buss, reciprocating co-kneader with special screw design). Typical temperature zones of the compounder during this compounding step ranged from 140° C. to 200° C., and an extrusion temperature around 160° C. The obtained melt mix product was pelletized and the pellets of each example sample were used for the below MFR and VR testing.

TABLE 1

The used components and the amounts of the compositions of the examples. The amounts are calculated based on the total amount (100 wt %) of the polymer composition

| Number of Example | Ref.ex. 1 | Inv.ex. |
|---|---|---|
| Polyolefin (a): PP | 48 | 47 |
| Functionalised polyolefin (b): Exxelor PO 1020 | 0 | 1.0 |
| Solid conductive filler (c): Carbon black | 30 | 30 |
| Optional second polymer (d): EBA | 20 | 20 |
| Antioxidant: TMQ | 2 | 2 |

All materials were aged in a cell oven at 135° C. for 0 h, 24 h and 48 h (see Table 2 and 3). After the ageing MFR for each composition was measured at 230° C. with 50 kg. The strings from the MFR-experiments were used to measure resistivity after cooling down to room temperature (RT).

TABLE 2

MFR as a function of ageing time

| Ageing time | Ref.ex 1 | Inv.ex. |
|---|---|---|
| 0 h | 2.36 | 2.65 |
| 24 h | 0.21 | 0.23 |
| 48 h | 0.09 | 0.13 |

The table 2 shows the effect of the functionalised polyolefin (b) on the melt flow behaviour.

In FIG. 1 the volume resistivity is given as a function of ageing time and concentration of MAH-g-PP.

TABLE 3

Volume resistivity (VR) in ohm*cm at room temperature as the function of ageing time measured from a sample after the MFR measurement of table 2
VR in ohm*cm at RT (after MFR$_s$ at 230° C.)

| Ageing time | Ref.ex | Inv.ex. |
|---|---|---|
| 0 h | 8.06 | 7.17 |
| 24 h | 21.51 | 15.91 |
| 48 h | 46.64 | 20.08 |

The results in table 3 show that the volume resistivity of the reference example comprising a polypropylene and carbon black increased in course of ageing. This inferred that the performance of the cable would deteriorate while in operation. Surprisingly, the volume resistitivity of the polymer composition of the inventive example comprising additionally the functionalised polyolefin (d) component was markedly less increased. Thus the presence of the functionalised polyolefin (d) in the polymer composition of the invention improves the long term thermal stability, whereby the composition can function for longer times at elevated temperatures.

The invention claimed is:

1. A cable comprising a conductor surrounded by at least one layer, wherein the layer comprises a polymer composition comprising a) a polypropylene homopolymer or a polypropylene copolymer with one or more comonomers, b) a polyolefin functionalized with an anhydride of a mono- or polycarboxylic acid, wherein said anhydride of a mono- or polycarboxylic acid can be linear or cyclic, wherein the functionalized polyolefin (b) is different from the polypropylene homopolymer or polypropylene copolymer (a) or the second polymer (d), and wherein the amount of the functionalized polyolefin is up to 10 wt % based on the total amount (100%) of the polymer composition, c) a solid conductive filler and, d) a LDPE homopolymer or a LDPE copolymer of ethylene with one or more comonomers having a melting temperature (Tm) less than the Tm of the polypropylene homopolymer or polypropylene copolymer (a).

2. The cable according to claim 1, wherein the cable is a cable comprising a conductor surrounded by at least a semiconductive layer comprising the polymer composition, or a cable comprising a conductor surrounded by at least an inner semiconductive layer, an insulation layer and an outer semiconductive layer, in that order, wherein at least the inner semiconductive layer or the outer semiconductive layer comprises the polymer composition.

3. The cable according to claim 1, wherein polymer composition comprises the polypropylene homopolymer or copolymer (a) in an amount of from 40 to 99.5 wt % based on the combined weight (100 wt %) of the polypropylene homopolymer or copolymer (a), the functionalized polyolefin (b) and the second polymer (d) present in the polymer composition.

4. The cable according to claim 1, wherein the polymer composition comprises the second polymer (d) in an amount of from 0 to 65 wt % based on the combined weight (100 wt %) of the polypropylene homopolymer or copolymer (a), the functionalized polyolefin (b) and the second polymer (d) present in the polymer composition.

5. The cable according to claim 1, wherein the polymer composition comprises the solid conductive filler (c) in an amount of up to 50 wt % on the total amount (100 wt %) of the polymer composition.

6. The cable according to claim 1, wherein the polymer composition has an MFR (230° C., 5.0 kg) from 0.01 to 30.0 g/10 min.

7. The cable according to claim 1, wherein the solid conductive filler (c) is carbon black.

8. The cable according to claim 1, wherein the polymer composition present in one or more layers is non-crosslinked after producing the cable.

9. A process for producing the cable according to claim 1, which comprises the steps of (a) providing and mixing the polymer composition of claim 1, (b) applying a meltmix of the polymer composition obtained from step (a) on a conductor to form at least one layer of the cable.

10. The process of claim 9 for producing a power cable comprising a conductor surrounded by an inner semiconductive layer, an insulation layer, and an outer semiconductive layer, in that order, wherein the process comprises the steps of (a)
    providing and mixing a first semiconductive composition comprising a polymer, a conductive filler and further component(s) for the inner semiconductive layer,
    providing and mixing a polymer composition for the insulation layer,
    providing and mixing a second semiconductive composition comprising a polymer, a conductive filler and further component(s) for the outer semiconductive layer, (b)
    applying on a conductor,
    a meltmix of the first semiconductive composition obtained from step (a) to form the inner semiconductive layer,
    a meltmix of polymer composition obtained from step (a) to form the insulation layer, and
    a meltmix of the second semiconductive composition obtained from step (a) to form the outer semiconductive layer, wherein at least one of the first semiconductive composition or the second semiconductive composition comprises the polymer composition of claim 1.

11. The cable according to claim 1, wherein the anhydride is maleic anhydride.

12. The cable according to claim 1, wherein the polyolefin in component (b) is polypropylene or polyethylene.

13. The cable according to claim 1, wherein the polyolefin in component (b) is a homopolymer of propylene, random copolymer of propylene, or a heterophasic copolymer of propylene.

14. The cable according to claim 1, wherein the functionalized polyolefin (b) comprises a polypropylene grafted with maleic anhydride.

15. The cable according to claim 1, wherein the polypropylene homopolymer or copolymer (a) comprises a heterophasic propylene copolymer composition comprising a polypropylene homopolymer or random copolymer matrix (1) and dispersed therein a second propylene copolymer (2).

16. The cable according to claim 1, wherein the polymer composition comprises the functionalized polyolefin (b) in an amount of from 0.1 to 4.0 wt % based on the total amount (100 wt %) of the polymer composition.

\* \* \* \* \*